(12) United States Patent
Ossia

(10) Patent No.: US 6,747,635 B2
(45) Date of Patent: Jun. 8, 2004

(54) MULTI-MODE HANDHELD COMPUTER

(76) Inventor: Kamran Ossia, 26662 Cuenca Dr., Mission Viejo, CA (US) 92691-6216

(*) Notice: Subject to any disclaimer, the term of this patent is extended or adjusted under 35 U.S.C. 154(b) by 223 days.

(21) Appl. No.: 10/017,195

(22) Filed: Dec. 14, 2001

(65) Prior Publication Data

US 2003/0206394 A1 Nov. 6, 2003

Related U.S. Application Data

(60) Provisional application No. 60/256,008, filed on Dec. 16, 2000.

(51) Int. Cl.$^7$ .............................. G09G 5/00; G06F 1/16
(52) U.S. Cl. ...................... 345/169; 345/172; 345/173; 345/905; 361/681; 361/683
(58) Field of Search ................... 345/168–179, 345/901, 905; 361/680–683, 686; 273/148 B; 463/37–38; 341/22; 400/472, 484–489

(56) References Cited

U.S. PATENT DOCUMENTS

| | | | |
|---|---|---|---|
| 4,933,514 A | * 6/1990 | Bowers | 178/18 |
| 5,049,862 A | * 9/1991 | Dao et al. | 340/706 |
| 5,241,303 A | 8/1993 | Register et al. | |
| 5,268,816 A | 12/1993 | Abell, Jr. et al. | |
| 5,268,817 A | 12/1993 | Miyagawa et al. | |
| 5,276,589 A | 1/1994 | Bartlett et al. | |
| 5,548,478 A | 8/1996 | Kumar et al. | |
| 5,638,257 A | 6/1997 | Kumar et al. | |
| 5,995,025 A | * 11/1999 | Sternglass et al. | 341/22 |
| 6,006,243 A | 12/1999 | Karidis | |
| 6,020,878 A | * 2/2000 | Robinson | 345/173 |
| 6,025,986 A | * 2/2000 | Sternglass et al. | 361/680 |
| 6,047,196 A | * 4/2000 | Makela et al. | 455/556 |
| 6,259,597 B1 | * 7/2001 | Anzai et al. | 361/683 |
| 6,427,078 B1 | * 7/2002 | Wilska et al. | 455/550 |
| 6,445,932 B1 | * 9/2002 | Soini et al. | 455/556 |
| 6,587,700 B1 | * 7/2003 | Meins et al. | 455/575 |

* cited by examiner

Primary Examiner—Lun-Yi Lao (57) ABSTRACT

A palm sized lightweight computer has a base unit; a display section mounted on the base unit movable among closed, open, and stacked positions; a touchpad section mounted on the base unit movable among stowed, extended, and folded positions; a keyboard mounted on the base unit changeable between portrait and landscape layouts; and programmable pushbuttons mounted on the display section and on the base unit. The computer can be used in three modes: a desktop mode, where the display section is open, the touchpad section is extended, and the keyboard is in landscape layout; a keyboard-less handheld mode, where the display section is stacked and the touchpad section is folded; and a handheld mode with keyboard entry, where the display section is open, the touchpad section is folded, and the keyboard is in portrait layout. For storage and transit, the display section is closed and the touchpad section is stowed inside the unit.

3 Claims, 6 Drawing Sheets

| | | | | |
|---|---|---|---|---|
| Esc<br>A | _<br>B | ~<br>C | "<br>D | PgUp<br>E |
| /<br>F | -<br>G | `<br>H | '<br>I | PgDn<br>J |
| ;<br>K | +<br>L | {<br>M | }<br>N | \|<br>O |
| ,<br>P | =<br>Q | [<br>R | ]<br>S | \\<br>T |
| .<br>U | :<br>V | <<br>W | ><br>X | ?<br>Z |
| Tab<br>Z | Space | | | Home<br>↑ |
| ! F1<br>1 | @ F2<br>2 | # F3<br>3 | $ F4<br>4 | End<br>↓ |
| % F5<br>5 | ^ F6<br>6 | & F7<br>7 | * F8<br>8 | Ins<br>→ |
| ( F9<br>9 | ) F10<br>0 | F11<br>. | F12<br>Enter | Del<br>← |
| CAPS<br>BkSp | Alt | Ctrl | Shift | F |

| | | | | | | | | |
|---|---|---|---|---|---|---|---|---|
| CAPS<br>BkSp | Esc<br>A | _<br>B | ~<br>C | "<br>D | PgUp<br>E | ! F1<br>1 | @ F2<br>2 | # F3<br>3 | Home<br>↑ |
| Alt | /<br>F | -<br>G | `<br>H | '<br>I | PgDn<br>J | $ F4<br>4 | % F5<br>5 | ^ F6<br>6 | End<br>↓ |
| Ctrl | ;<br>K | +<br>L | {<br>M | }<br>N | \|<br>O | & F7<br>7 | * F8<br>8 | ( F9<br>9 | Ins<br>→ |
| Shift | ,<br>P | =<br>Q | [<br>R | ]<br>S | \\<br>T | ) F10<br>0 | F11<br>. | F12<br>Enter | Del<br>← |
| F | .<br>U | :<br>V | <<br>W | ><br>X | ?<br>Y | Tab<br>Z | Space | | |

FIG. 14

MULTI-MODE HANDHELD COMPUTER

CROSS REFERENCE TO RELATED APPLICATIONS

Priority is claimed based on Provisional Patent Application No. 60/256,008 filed on Dec. 16, 2000 and Disclosure Document No. 468746 received at the USPTO on Feb. 7, 2000.

STATEMENT REGARDING FED SPONSORED R & D

Not applicable.

REFERENCE TO A TABLE IN THE APPENDIX

The table in the Appendix contains a list of all drawing references.

BACKGROUND OF THE INVENTION

The present invention relates in general to processor based devices operable while being held in a user's hand, and more specifically, to a handheld computing device which incorporates both keyboard and mouse functionality and is capable of being operated in one hand or on a desktop. This invention also relates to a remote control unit which provides keyboard and mouse functionality in addition to conventional remote control functions for consumer electronics or computing devices.

Portable computing and communication devices are quickly becoming ubiquitous tools for both business and personal activities. The smallest and lightest of these devices are suitable for and most often carried and operated while being held in the hand of its user. Typical of these devices are the variety of so-called personal digital assistants (PDAs) now commercially available. Whereas historically user input to computing and communication devices has been primarily through a keyboard and a mouse, PDAs have eliminated the keyboard and mouse due to the inconvenience of carrying the additional accessories. In PDAs the mouse function has been partially duplicated by a touch-sensitive screen activated by a stylus or pen or a finger. However, using a stylus in this manner is difficult, particularly when standing or when a level and stable resting surface is unavailable, because these pen computers do not provide a flat surface on which to rest the hand while writing. Consequently, the user's hand is forced to hover above the touch-sensitive display, resulting in fatigue and illegible writing. In addition, stylus operation is not as versatile as that of a two- or three-button mouse, and pen computing in general is not ergonomic. Similarly, the keyboard functionality in these devices has been replaced either by a handwriting recognition software or by a "soft keyboard" in which the image of a keyboard is displayed on the screen and the user selects the individual letters using a stylus. However, both of these methods are slow and cumbersome and reduce the available screen area. As experience with PDAs has increased, it has been recognized that from time to time nearly all applications and users would benefit from the ability to perform full-function keyboard and mouse input.

There have been efforts to provide both desktop and handheld computers in a single housing. Most of these efforts have involved repositioning the display of a laptop computer so that it covers and hides the keyboard, typically in the manner of a tablet. Exemplary of these efforts are the laptop computers shown in U.S. Pat. Nos. 5,276,589 and 5,268,816 in which the display is mounted to slide or pivot in three dimensions over the keyboard; the laptop computer shown in U.S. Pat. No. 5,241,303 in which the display and keyboard can be detached and repositioned with the display lying flat and the keyboard stored in a compartment under the display. In U.S. Pat. No. 5,268,817 Miyagawa et al. disclose a portable computer with keyboard and having a display unit with coordinate input tablet rotatably mounted to face either toward or away from keyboard when closed over keyboard. In U.S. Pat. No. 5,548,478 Kumar et al. disclose a portable computing device having an adjustable hinge by which the display section can be affixed in place facing inward or outward. In U.S. Pat. No. 5,638,257 Kumar et al. disclose a combination keyboard and cover for a handheld computer in which the user rotates keyboard from a non-operational position substantially covering the handheld computer display to an operational position at substantially a right angle to the display. In U.S. Pat. No. 6,006,243 Karidis discloses a foldable display screen notebook computer with touch-screen operational capabilities and where the display section and its component back section are detachable from the base unit.

The present invention relates in general to processor based devices operable while being held in a user's hand, and more specifically, to a handheld computing device which incorporates both keyboard and mouse functionality and is capable of being operated in one band or on a desktop.

Some pen computers and PDAs currently commercially available do include a socket to connect a conventional or folding keyboard. However, given the inconvenience of carrying, connecting and operating a completely external keyboard, existing pen computer and PDA users often elect to go without keyboard input.

In addition, none of the devices in the prior art enable the user to both navigate through icons on the computer screen and type on the keyboard while holding the device in one hand.

BRIEF SUMMARY OF THE INVENTION

The present invention overcomes the problems noted above and satisfies the need for ergonomic keyboard and mouse operation in a handheld device.

It is, therefore, an object of the present invention to achieve a more accomplished information processing apparatus capable of operating in three modes, one as a desktop unit and two as a handheld unit with or without keyboard entry.

Another object of this invention is to provide the full functionality of a personal computer in a practical and user-friendly way in a small form factor device.

A further object of this invention is to provide full keyboard and mouse functionality in a handheld remote control.

Provided is a hybrid packaging design for a portable personal computer which is substantially the same size and weight as a palmtop computer and which combines elements of both desktop and palmtop computers, but with new features of a full-function ergonomic keyboard and mouse to provide additional functionality and flexibility.

In a preferred embodiment, the present invention comprises a handheld computer having a base unit; a touchpad section having a touch-sensitive surface and a plurality of pushbuttons, said touchpad being extendible facing upward for desktop operation and foldable 180° facing downward for handheld operation; a dual-orientation keyboard carried by the base unit; and a display section having a viewing surface with a plurality of pushbuttons, said display section being coupled to the base unit and movable between a closed position in which the viewing surface of the display section faces the keyboard, and an opened position in which the keyboard is uncovered and the display section is positioned beside the keyboard with an adjustable viewing angle.

The touchpad section is mounted to the base unit by means of a hinge mechanism coupled to the base unit in a manner that enables the touchpad section to pivot 180 degrees and be affixed in place facing rearward, namely in a folded position.

In a preferred embodiment, the present invention comprises a handheld computer having a base unit; a touchpad section having a touch-sensitive surface and a plurality of pushbuttons, said touchpad being extendible facing the front for desktop operation and foldable 180 degree facing the rear for handheld operation; a dual-orientation keyboard carried by the base unit; and a display section having a viewing surface with a plurality of pushbuttons, said display section being coupled to the base unit and movable between a closed position in which the viewing surface of the display section faces the keyboard, and an opened position in which the keyboard is uncovered and the display section is positioned beside the keyboard with an adjustable viewing angle.

The mounting mechanism for the display conveniently enables the display to cover the keyboard when use of the keyboard is not required, and to quickly uncover the keyboard and arrange the display at a convenient viewing angle when keyboard input is needed or when the computer is to be used on a desk top or other support surface.

Of critical importance is the ability of the user to have both touchpad and keyboard functionality at the same time while holding the device in one hand. This aspect of the current invention is absent in all prior art devices.

Another crucial aspect of the invention is the improved ergonomics for data entry. A mouse or similar pointing device is indispensable in modern general-purpose computers. Conventional Personal Digital Assistants (PDAs) and pen computers provide partial mouse functionality in the form of a touch-sensitive screen. The present invention, on the other hand, provides a touchpad and a plurality of programmable buttons which together provide the full functionality of a three-button mouse or a wheel mouse. Similarly, conventional devices provide partial keyboard functionality in the form of section of the touch-sensitive screen allocated either for handwriting recognition or for a "soft keyboard" which is a partial keyboard layout displayed on the screen for a "hunt-and-peck" style input using a stylus. Both of these mechanisms are slower and less ergonomic than the keyboard proposed herein on which a user can type at high speed. In addition, conventional methods occupy a significant space on the screen, making text editing more difficult, whereas in the current invention the entire display screen is fully available and unobstructed at all times. The stylus is another non-ergonomic element for the users of conventional devices, becoming a source of fatigue and discomfort after several minutes of continuous use. The current invention does not use a stylus.

In another embodiment, the device minus the display unit can be used as a keyboard and mouse combination for another device. In either a wired or wireless configuration, this embodiment is well suited for use in industrial applications or with consumer electronics appliances such as television set top boxes. Set top boxes are used mainly for sending and receiving email and for navigating the Internet through a television set, in which case the user is usually seated at a distance without a desk. Having a small remote control which can be held and manipulated in one hand provides a more pleasant user experience than having a full size keyboard on the lap. The keyboard templates in this case would comprise a portrait layout and a conventional remote control layout.

The innovation is enhanced with features which include multilingual keyboard layouts, various input/output ports, and various docking/support stations. The combination of these items enables a variety of new usage scenarios, and enables the system to receive wide acceptance from the user community.

For a fuller understanding of the nature and advantages of the invention, reference should be made to the ensuing detailed description taken in conjunction with the accompanying drawings.

BRIEF DESCRIPTION OF THE DRAWINGS

The stated advantages of the invention may be better understood by referring to the ensuing detailed description in conjunction with the drawings in which.

DETAILED DESCRIPTION

Figure 1:
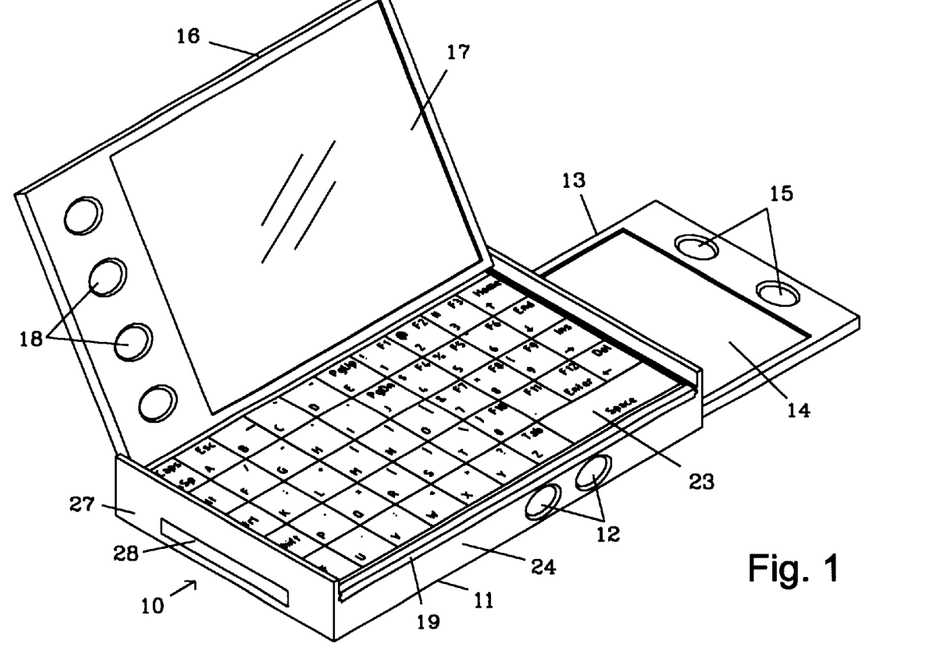
FIG. 1 is a perspective front view of the computer in accordance with the present invention depicting the computer as used in desktop mode with the display section open and the touchpad section extended.

Referring to FIG. 1, in a preferred embodiment thereof the present invention provides a specially designed portable handheld computer 10 that includes an elongated rectangular base unit 11, sized to be held and manipulated in one hand, in which the main electronic circuitry of the computer is operatively disposed, a touchpad section 13 shown in its extended position, and a display section 16 shown in its open position. Base unit 11 has a front side wall 22, a rear side wall 23, a left side wall 24, a right side wall 25, a top end wall 26, and a bottom end wall 27. The base unit further includes programmable pushbuttons 12 mounted on its right and left sides, a removable storage media interface 28, and means for wired and wireless communication.

A touch-sensitive surface 14 and a plurality of pushbuttons 15 are operatively mounted on touchpad section 13 which together act as a mouse type input to the computer. Pushbuttons 12 and 15 can be programmed as various mouse buttons such as left, right, middle, scroll up, or scroll down to be used in conjunction with the touchpad.

Figure 2:
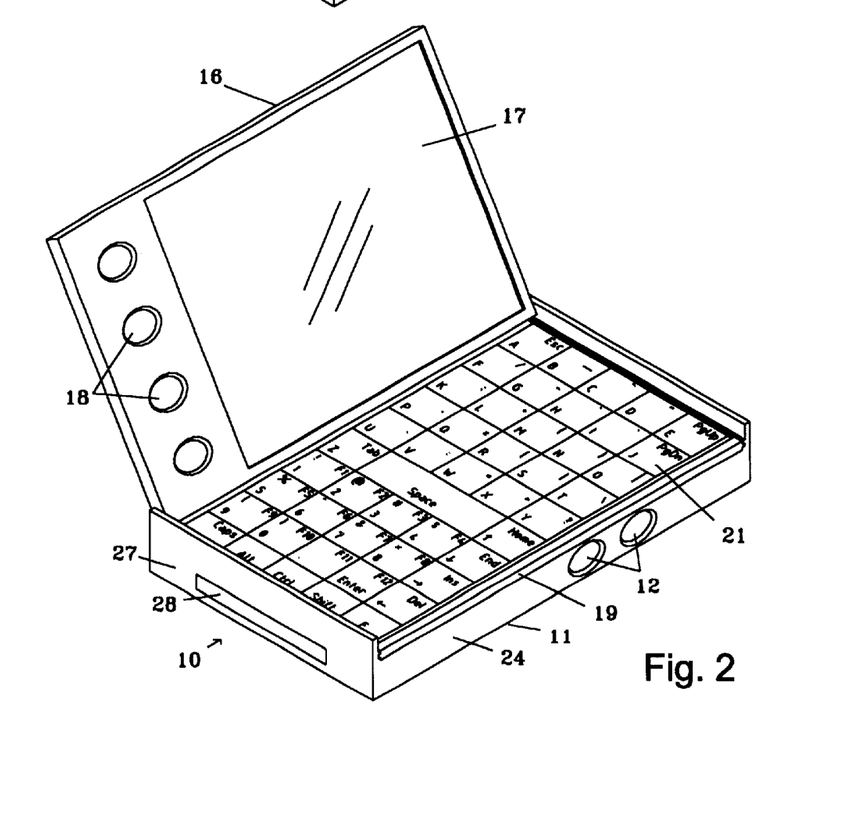
FIG. 2 is a perspective front view of the computer as used in the handheld mode with keyboard entry with the display section open and the touchpad section folded.

A display screen 17 is operatively mounted on display section 16 and, as viewed in FIG. 2, has a rectangular configuration. Also mounted on display section 16 are programmable pushbuttons 18.

Turning now to FIGS. 1 and 2, according to a primary aspect of the present invention, handheld computer 10 is specially designed to be operated by a user in a selectively variable one of two different display screen orientations: a portrait orientation (FIG. 2) in which the longer dimension of display screen 17 is vertically oriented, and a landscape orientation (FIG. 1) in which the longer dimension of display screen 17 is horizontally oriented.

Referring again to FIG. 1, the computer may be used in its landscape orientation in desktop mode. In this mode, keypad 19 is inserted into its position over base unit 11 with landscape layout 20 visible, and pushbuttons 12, 15, and 18 can be programmed for mouse controls and activated with the user's right or left hand, thus providing full mouse functionality.

Now turning to FIG. 2, the computer may be used in its portrait orientation in handheld mode. In this mode, keypad 19 is inserted into its position over base unit 11 with portrait layout 21 visible, and pushbuttons 12, and 18 can be programmed for mouse controls and activated with the user's right or left hand, thus providing full mouse functionality.

Figure 3:
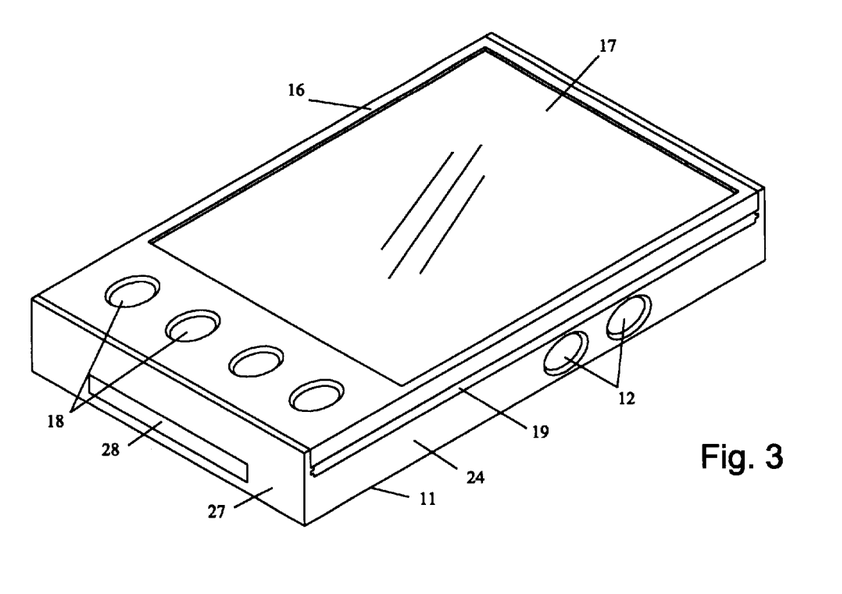
FIG. 3 is a perspective front view of the computer as used in the handheld mode without keyboard entry with the display section stacked and the touchpad section folded.

Referring to FIG. 3, display section 16 is slid across base unit 11 and affixed in place with display screen 17 visible, i.e. in stacked position. Touchpad section 13 is in folded position and can be operated with the index finger of the hand grasping the unit. This is a second handheld configuration in which the user does not need immediate access to the keyboard.

Figure 4:
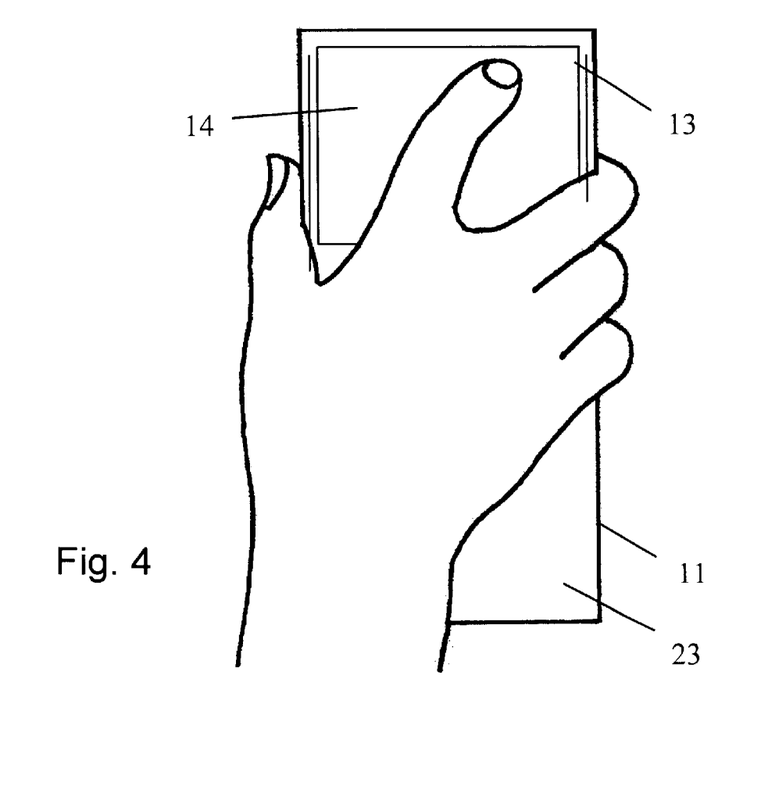
FIG. 4 is the rear view of the computer and the position of the hand holding the unit.

FIG. 4 shows the rear view of the computer and the position of the user's hand in the handheld mode. Pushbuttons 12 and 18 are accessible in this mode and can be programmed to act as left, right, middle, scroll up, or scroll down mouse buttons.

Figure 5:
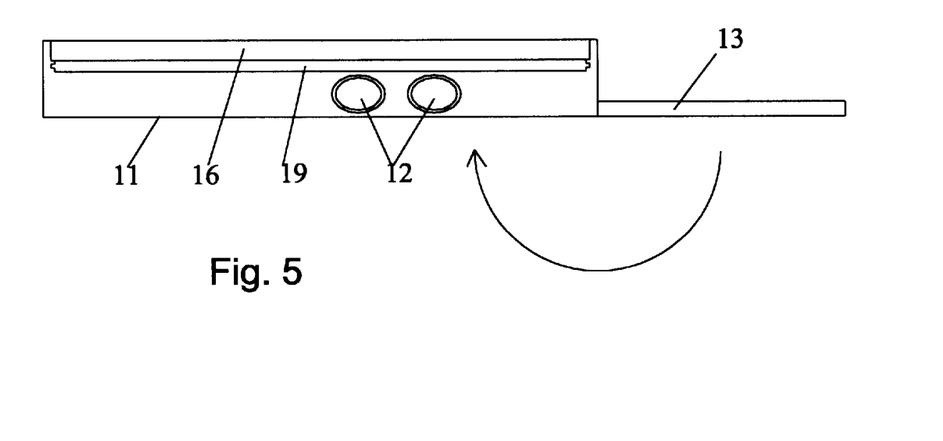
FIG. 5 is a right view of the computer showing the movement of the touchpad section from extended to the folded position.

Now referring to FIG. 5, touchpad section 13 can be moved from the extended position to the folded position, i.e. affixed in place with the touchpad surface facing rearward by following the indicated arrows.

Figure 6:
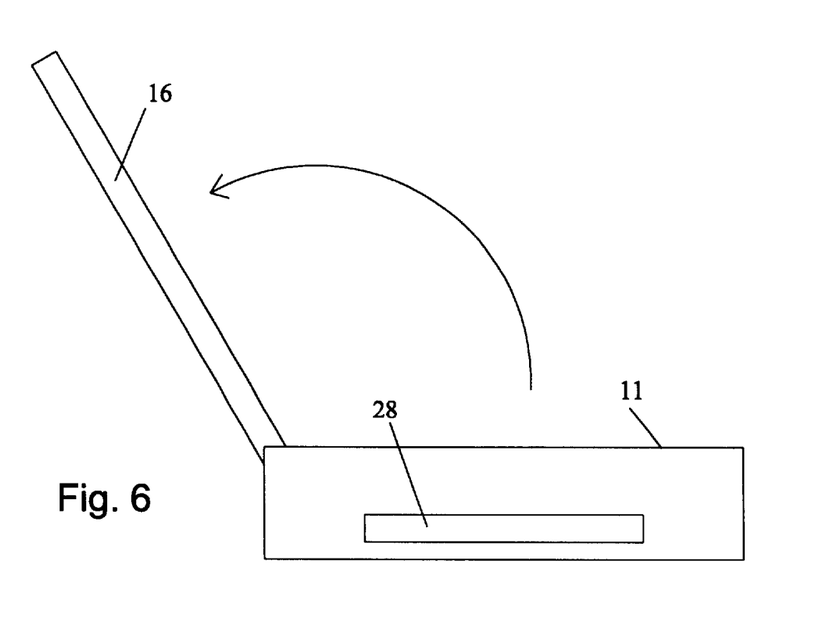
FIG. 6 is a bottom view of the computer showing the movement of the display section from the closed to the open position.

FIG. 6 is a bottom view of the computer showing the sequence of movements of display section 16 from the closed to the open position. Display section 16 can be adjusted for the best viewing angle.

Figure 7:
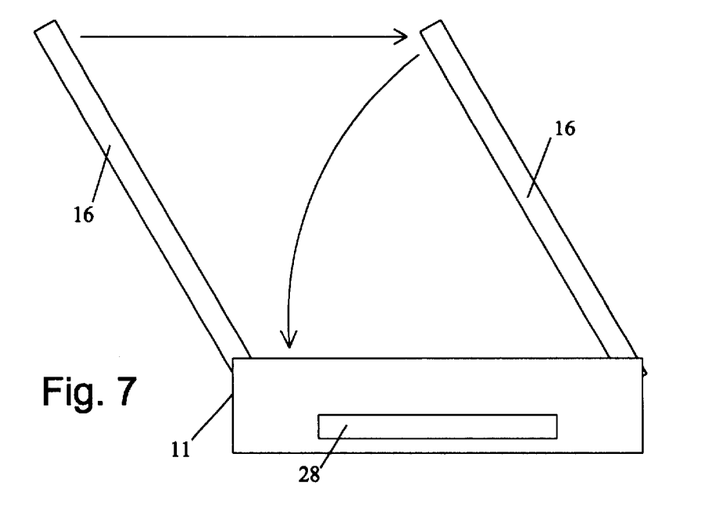
FIG. 7 is a bottom view of the computer showing the movement of the screen from the open to the stacked position.

Turning now to FIG. 7, display section 16 can be moved from the open position to the stacked position, i.e. affixed in place with display screen 17 facing outward, by following the indicated arrows.

Figure 8:
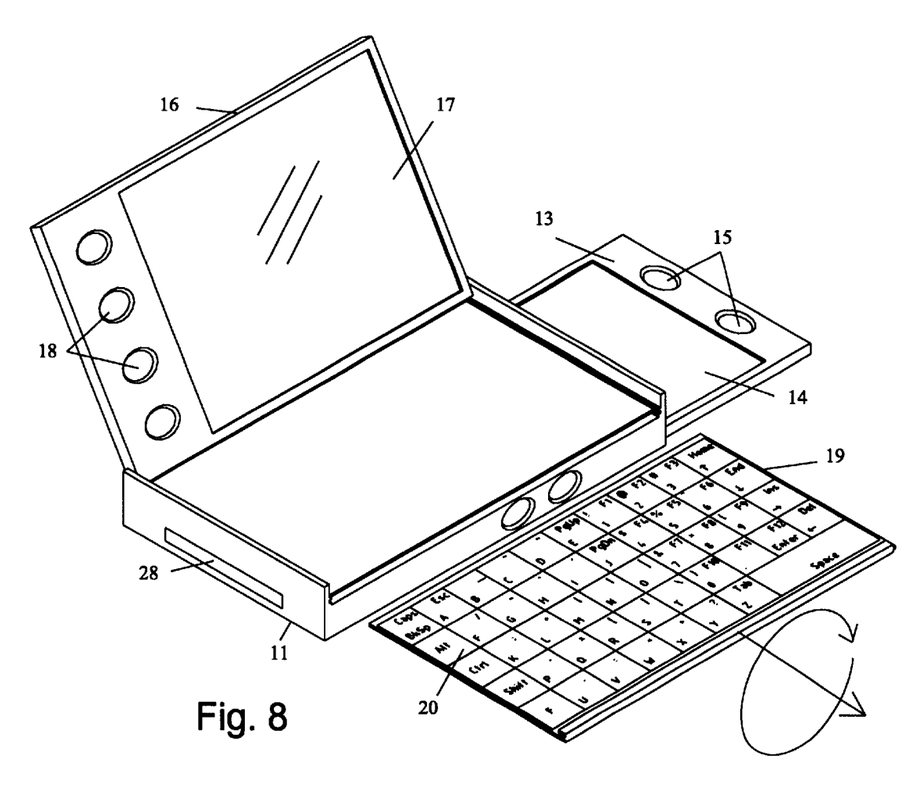
FIG. 8 is a perspective view of the computer showing the movement of the keypad section to change its orientation from portrait to landscape and vice versa.

FIG. 8 shows the operation of switching the keypad from one layout to another by pulling it out of its slot above the base unit and flipping it over. The two sides of keypad section 19 can have different layouts, normally a landscape layout for use in the desktop mode and a portrait layout for use in the handheld mode. Not shown is the mechanism by which the computer can automatically detect the orientation of the keyboard, however it should be clear to those skilled in the art how to provide a mechanical, optical, or electrical means to achieve this.

Figure 9:
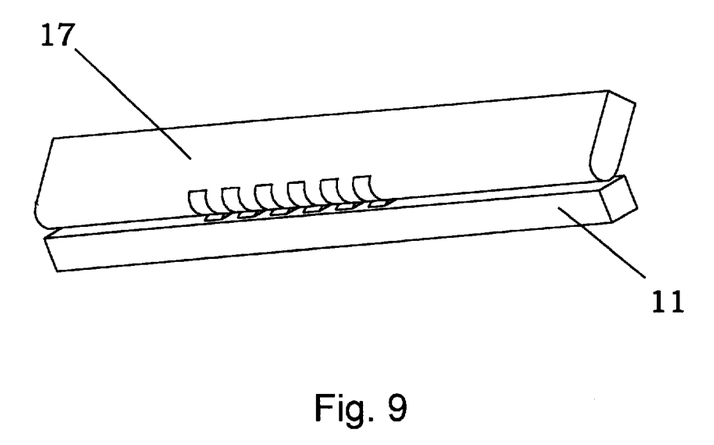
FIG. 9 is a perspective view of portions of the base unit and the display section showing the electrical connection between the two.

Referring to FIG. 9, a plurality of conductive pins on base unit 11 make contact with corresponding conductive curved surfaces on display section 16. The curved surfaces enable display section 16 to pivot while maintaining electrical contact with the base unit to supply power and control and data signals to the display.

Figure 10:
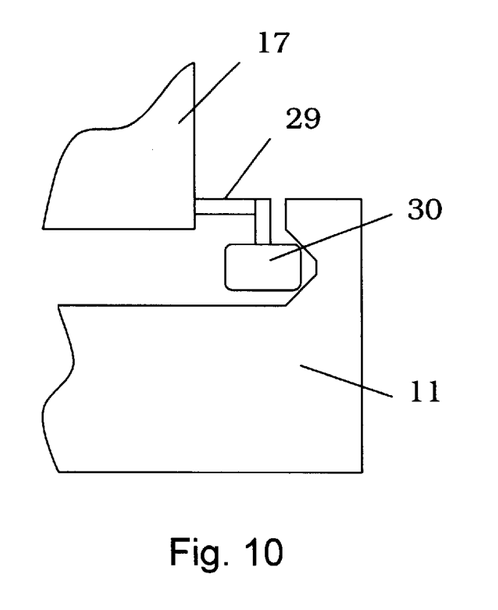
FIG. 10 is a cross-sectional view of the details of an exemplary hinge and roller mechanism coupling the base unit to the display section as well as to the touchpad section.
Figure 11:
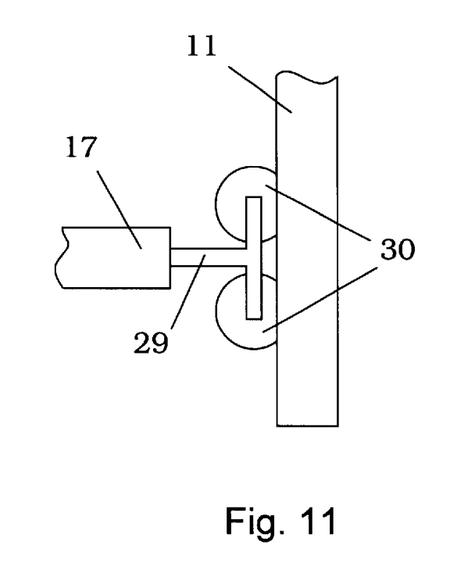
FIG. 11 is a plan view of the details of an exemplary hinge and roller mechanism coupling the base unit to the display section as well as to the touchpad section.

As seen in FIGS. 10 and 11, hinge 29 and roller mechanism 30 enables display section 16 to move across the front surface of base unit 11. The same mechanism enables touchpad section 13 to move in and out of base unit 11. The use of two rollers allows a smooth and jam-resistant movement of each section.

Figure 12:
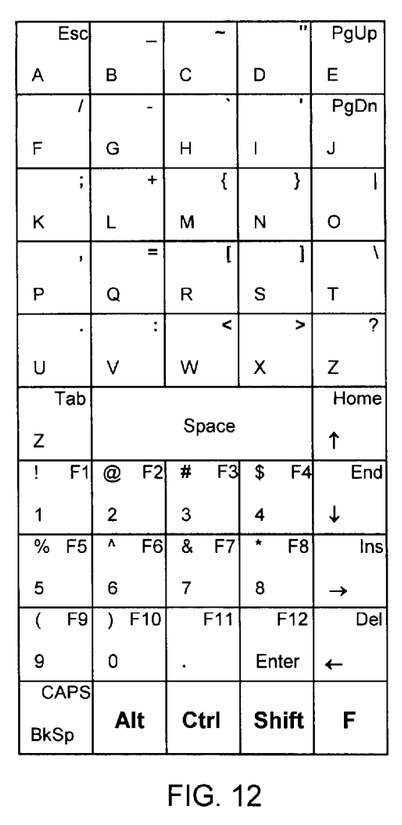
FIGS. 12 and 13 show exemplary portrait and landscape layouts for the keyboard.
Figure 13:
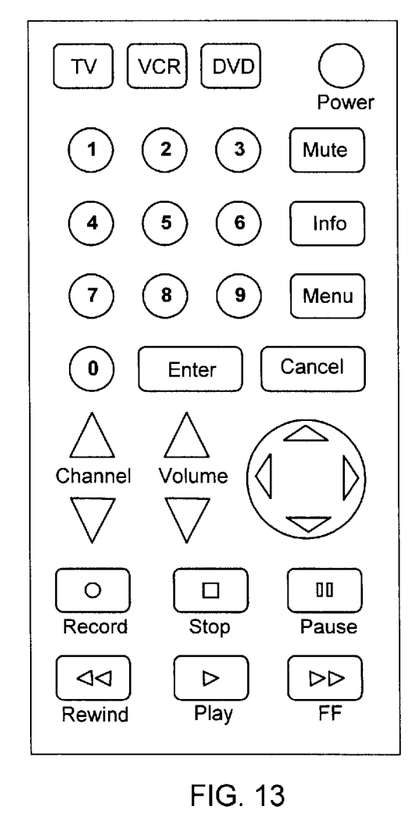

As shown in FIG. 12 and FIG. 13, the keyboard layouts are designed such that the most commonly used characters, i.e. letters, numbers, arrows, etc. to be accessed with single keystrokes. The punctuation character associated with each number key is the same as that on a standard keyboard and entered using the Shift key. The Shift key also produces the uppercase letters when used in conjunction with the letter keys. The "F" key enables the entry of function keys and the remaining punctuation characters printed on the letter keys. Preferably, the Shift key and the "F" key are of distinct colors than the rest of the keys, with the Shift- and F-operated characters on all keys printed in the same color as the Shift key and the "F" key respectively for easier identification. The locations of the Shift, Alt, Ctrl, and "F" keys are preferably invariant under landscape-to-portrait transformation.

Figure 14:
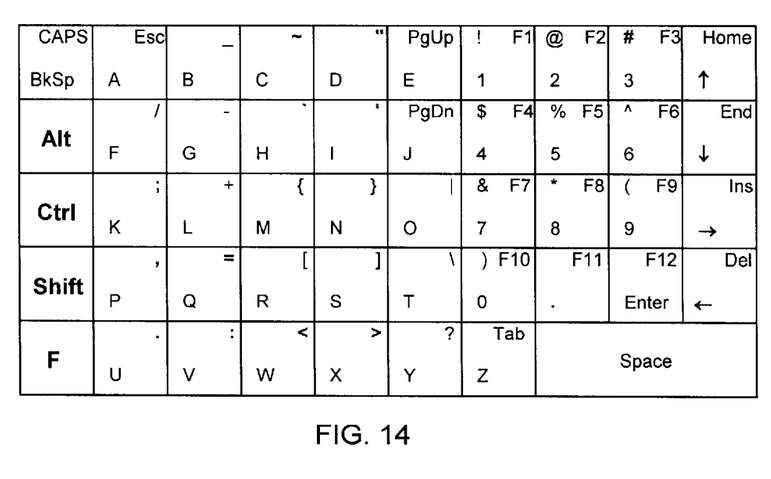
FIG. 14 shows an exemplary layout for an audio/video remote control unit.

FIG. 14 shows an example of a key layout for an audio/video device.

Although the present invention and its advantages have been described in detail, it should be understood that various changes, substitutions and alterations can be made herein without departing from the spirit and scope of the invention.

APPENDIX: LIST OF DRAWING REFERENCES

The following table contains the reference numbers used in the attached drawings.

| | |
|---|---|
| 10 | Portable Computer Assemblage |
| 11 | Base Unit |
| 12 | Pushbuttons on the base unit |
| 13 | Touchpad section |
| 14 | Touch sensitive surface on the touchpad |
| 15 | Pushbuttons on the touchpad |
| 16 | Display section |
| 17 | Display screen on the display section |
| 18 | Pushbuttons on the display section |
| 19 | Keypad section |
| 20 | Landscape keypad layout |
| 21 | Portrait keypad layout |
| 22 | Front surface of the base unit |
| 23 | Rear surface of the base unit |

| | |
|---|---|
| 24 | Right surface of the base unit |
| 25 | Left surface of the base unit |
| 26 | Top surface of the base unit |
| 27 | Bottom surface of the base unit |
| 28 | Removable storage media slot |
| 29 | Hinge element of carriage assembly |
| 30 | Roller elements of carriage assembly |

I claim:

1. A portable computer assemblage comprising:

a base unit sized such as to be held in one hand, said base unit having a front surface, a rear surface, a left surface, a right surface, a top surface, and a bottom surface, said front and rear surfaces being the ones with largest area;

a plurality of pushbuttons located on said base unit;

a touch sensitive surface covering substantially the front surface of said base unit;

an interchangeable double-sided keyboard template overlaying said touch sensitive surface wherein at least one keyboard template has a portrait-oriented key layout printed on one side and a landscape-oriented key layout printed on the other side, said layouts containing alphanumeric keys of a standard computer keyboard;

means for uniquely encoding said templates, said encoding being unique to a pattern displayed on the template and also indicating the orientation of said templates;

means for the computer to detect said encoding;

at least one groove carried within said base portion;

at least one roller disposed within said groove;

a second groove disposed within said base portion, opposite said first groove; at least one roller disposed within said second groove;

a planar touchpad section engaging said rollers whereby said touchpad section can slide in and out of the base unit;

a planar display section, including a display screen and a plurality of pushbuttons, pivotally connected to said base unit;

a carriage assembly connected to said first set of rollers; wherein the touchpad section is pivotally connected to said carriage assembly and rotatable by 180 degrees; means to enable said touchpad section to be affixed in place on the rear surface of the base unit facing outward; and means to maintain electrical connection between the base unit and the touchpad section.

2. The portable computer assemblage as defined in claim 1, further comprising: a third groove carried within said base portion; at least one roller disposed within said third groove; a fourth groove disposed within said base portion, opposite said third groove; at least one roller disposed within said fourth groove; a carriage assembly connected to said second set of rollers; wherein said display section is pivotally connected to said carriage assembly and rotatable by 180 degrees; wherein said carriage assembly can move transversally in said third and fourth grooves, means to enable said display section to be affixed in place over the front surface of said base unit facing either inward or outward; and means to maintain electrical connection between the base unit and the display section.

3. The portable computer assemblage as defined in claim 2, wherein the electrical connection is made by a plurality of pins located on said display section contacting a plurality of pins near two edges of the base unit.

* * * * *